US011678230B2

(12) United States Patent
Cai

(10) Patent No.: US 11,678,230 B2
(45) Date of Patent: Jun. 13, 2023

(54) WIRELESS COMMUNICATION NETWORK HANDOVERS OF WIRELESS USER EQUIPMENT THAT EXECUTE LOW-LATENCY APPLICATIONS

(71) Applicant: T-MOBILE INNOVATIONS LLC, Overland Park, KS (US)

(72) Inventor: Zheng Cai, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/713,359

(22) Filed: Apr. 5, 2022

(65) Prior Publication Data

US 2022/0232429 A1   Jul. 21, 2022

Related U.S. Application Data

(63) Continuation of application No. 17/122,118, filed on Dec. 15, 2020, now Pat. No. 11,368,881.

(51) Int. Cl.
| | |
|---|---|
| *H04W 4/02* | (2018.01) |
| *H04W 36/00* | (2009.01) |
| *H04W 4/024* | (2018.01) |
| *H04W 4/20* | (2018.01) |
| *H04W 40/36* | (2009.01) |

(52) U.S. Cl.
CPC ....... *H04W 36/0016* (2013.01); *H04W 4/024* (2018.02); *H04W 4/20* (2013.01); *H04W 40/36* (2013.01)

(58) Field of Classification Search
None
See application file for complete search history.

(56) References Cited

U.S. PATENT DOCUMENTS

| | | | |
|---|---|---|---|
| 8,537,781 | B2 | 9/2013 | Kotecha et al. |
| 8,948,395 | B2 | 2/2015 | Narayanan et al. |
| 10,244,444 | B2 | 3/2019 | Ozturk et al. |
| 10,313,916 | B2 | 6/2019 | Wang et al. |
| 10,412,616 | B1 | 9/2019 | Butler |
| 10,750,410 | B2 | 8/2020 | Vrzic et al. |

(Continued)

FOREIGN PATENT DOCUMENTS

EP   3637926 A1   4/2020

OTHER PUBLICATIONS

Penttinen, Jyrki T. J.; "Core Network: Security and Deployment of Advanced Mobile Communications"; In "5G Explained: Security and Deployment of Advanced Mobile Communications"; Feb. 27, 2019; pp. 139-186; John Wiley & Sons Ltd.; Chichester, United Kingdom.

*Primary Examiner* — Suhail Khan

(57) ABSTRACT

A wireless communication network serves a User Equipment (UE) that executes a low-latency application. A source Application Server (AS) exchanges low-latency data with the UE over a source wireless access node based on application context for the UE. The application context for the UE comprises a user identifier, a session identifier, and a session pointer. A target AS receives a handover notice and responsively retrieves the application context for the UE from the source AS. The target AS exchanges additional low-latency data with the UE over a target wireless access node based on the application context for the UE that comprises the user identifier, the session identifier, and the session pointer.

20 Claims, 10 Drawing Sheets

(56) References Cited

U.S. PATENT DOCUMENTS

| | | |
|---|---|---|
| 10,772,021 B2 | 9/2020 | Wang et al. |
| 2014/0277843 A1* | 9/2014 | Langlois ............... G06F 3/1454 701/2 |
| 2015/0071251 A1 | 3/2015 | Gupta et al. |
| 2016/0270118 A1 | 9/2016 | He et al. |
| 2018/0049079 A1 | 2/2018 | Ozturk et al. |
| 2019/0053117 A1 | 2/2019 | Bae et al. |
| 2019/0268815 A1 | 8/2019 | Zhu et al. |
| 2020/0195521 A1 | 6/2020 | Bogineni et al. |
| 2020/0329381 A1 | 10/2020 | Chou et al. |
| 2020/0374741 A1 | 11/2020 | Li et al. |
| 2021/0250838 A1 | 8/2021 | Lu et al. |

\* cited by examiner

WIRELESS COMMUNICATION NETWORK HANDOVERS OF WIRELESS USER EQUIPMENT THAT EXECUTE LOW-LATENCY APPLICATIONS

RELATED CASES

This United States patent application is a continuation of U.S. patent application Ser. No. 17/122,118 that was filed on Dec. 15, 2020 and is entitled "WIRELESS COMMUNICATION NETWORK HANDOVERS OF WIRELESS USER EQUIPMENT THAT EXECUTE LOW-LATENCY APPLICATIONS." U.S. patent application Ser. No. 17/122,118 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless access nodes are presently being distributed across different physical platforms. A Radio Unit (RU) is typically attached to a tower and has antennas and radios. The RU is linked to a Distributed Unit (DU) that typically handles the lower layers of baseband signal processing. The DU is physically linked to a Centralized Unit (CU) that typically handles the higher layers of baseband signal processing and is linked to a network core. In some wireless communication networks, the CU also hosts some network elements that were previously in the network core.

The wireless user devices execute user applications. Some of the user applications requires low-latency data communications. For example, an augmented-reality video-conferencing application may have to annotate and share live video among multiple wireless user devices. To serve the low-latency user applications, network elements called application servers are used to handle user data and/or control the handling of the user data for a specific user application. For example, an application server may annotate and share live video among augmented reality users. The application server may control other network elements that handle the live video among the augmented reality users.

As a wireless user device moves around and changes wireless access nodes, the wireless user device typically remains coupled to its original application server. Unfortunately, the extension of the user connection back to the same application server adds unwanted latency to the application session. Wireless access nodes do not handover wireless user devices in a manner that efficiently and effectively preserves the performance of their low-latency applications. Moreover, the wireless communication networks do not optimize their CUs to enhance the performance of the low-latency applications.

TECHNICAL OVERVIEW

A wireless communication network serves a User Equipment (UE) that executes a low-latency application. A source Application Server (AS) exchanges low-latency data with the UE over a source wireless access node based on application context for the UE. The application context for the UE comprises a user identifier, a session identifier, and a session pointer. A target AS receives a handover notice and responsively retrieves the application context for the UE from the source AS. The target AS exchanges additional low-latency data with the UE over a target wireless access node based on the application context for the UE that comprises the user identifier, the session identifier, and the session pointer.

DETAILED DESCRIPTION

Figure 1:
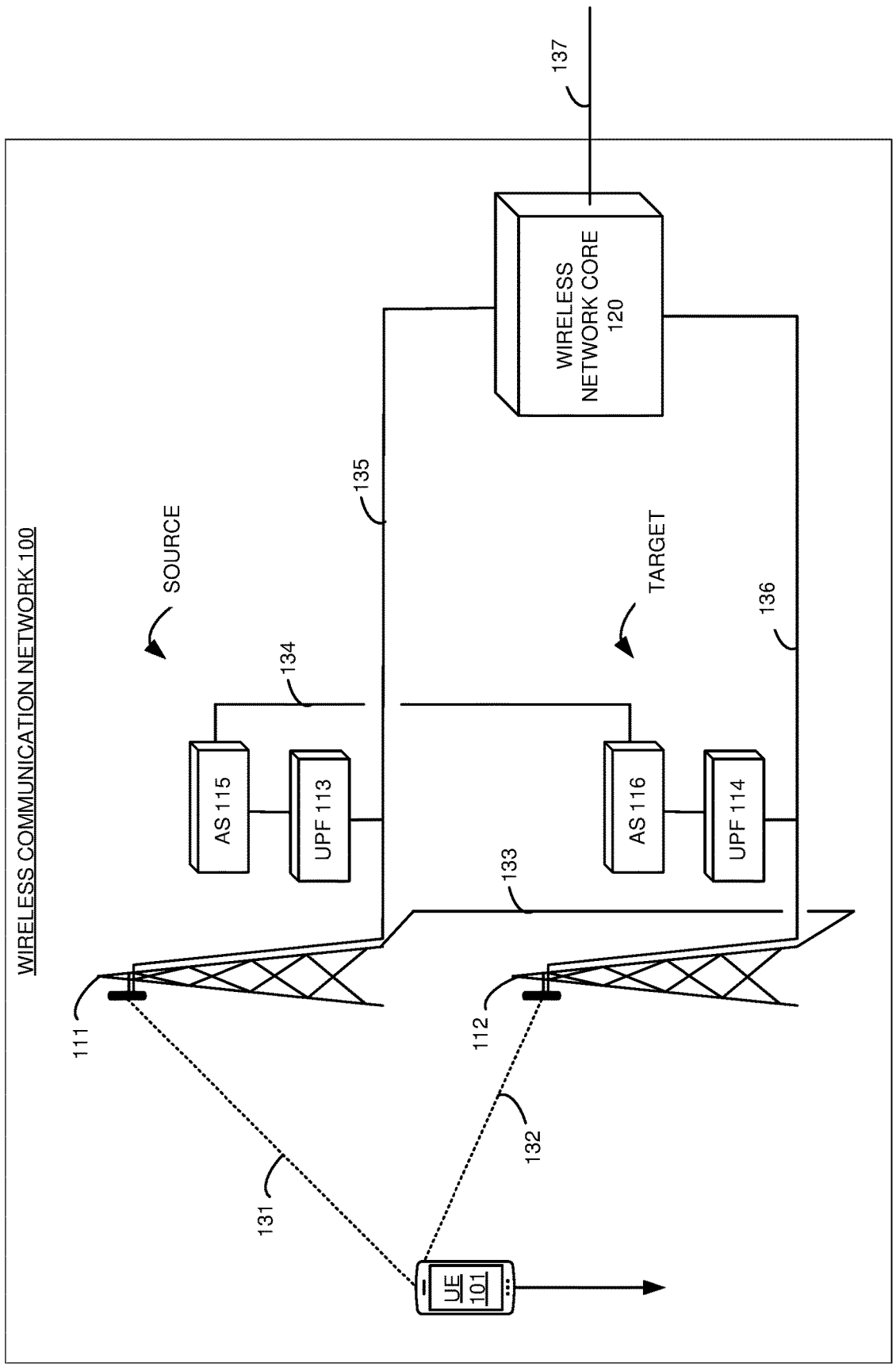
FIG. 1 illustrates a wireless communication network to handover a wireless User Equipment (UE) that executes a low-latency application.

FIG. 1 illustrates wireless communication network 100 to handover wireless User Equipment (UE) 101 that executes a low-latency application. Wireless communication network 100 delivers a low-latency wireless data service to UE 101 like video-conferencing, augmented-reality, vehicle navigation, remote keyboard, machine-control, and/or some other wireless networking product. Wireless communication network 100 comprises wireless UE 101, wireless access nodes 111-112, User Plane Functions (UPFs) 113-114, Application Servers (AS) 115-116, and wireless network core 120. Wireless access node 111, UPF 113, and AS 115 comprise source network elements that initially serve UE 101 before a handover. After the handover, wireless access node 112, UPF 114, and AS 116 comprise target network elements that subsequently serve UE 101 after the handover. The number of UEs, access nodes, UPFs, AS, and cores that are depicted on FIG. 1 has been restricted for clarity, and wireless communication network 100 may comprise many more UEs, access nodes, UPFs, AS, and cores.

Various examples of network operation and configuration are described herein. In some examples, UE 101 executes a low-latency application like augmented-reality, vehicle-navigation, remote keyboard, or some other user data service. AS 115 serves the low latency-application in UE 101 based on UE application context for UE 101. The UE application context characterizes the current user session with data like application version, session ID, user ID, session pointers, and other application session metadata. Initially, source AS 115 transfers application data for the low-latency application to source UPF 113 based on the UE application context for UE 101. Source UPF 113 transfers the application data for the low-latency application to source access node 111. Source access node 111 wirelessly transfers the application data for the low-latency application to UE 101. Source access node 111 then initiates a handover of UE 101 to target access node 112—possibly in response to UE mobility. After the UE 101 attaches to target access node 112, source AS 115 transfers application data for the low-latency application to source UPF 113 based on UE application context for UE 101. Source UPF 113 transfers the application data for the low-latency application to source access node 111. Source access node 111 transfers the application data for the low-latency application to target access node 112. Target access node 112 wirelessly transfers the application data for the low-latency application to UE 101.

Responsive to the initiation of the handover, target access node 112 transfers a handover notice to wireless network core 120. Wireless network core 120 transfers the handover notice to target UPF 114. Target UPF 114 transfers the handover notice to target AS 116. Target AS 116 retrieves the UE application context for UE 101 from source AS 115 based on the handover notice. After the UE context retrieval, target AS 116 transfers application data to target UPF 114 for the low-latency application based on the retrieved UE application context for UE 101. Target UPF 114 transfers the application data for the low-latency application to target access node 112. Target access node 112 wirelessly transfers the application data for the low-latency application to UE 101. Advantageously, wireless network core 120 efficiently and effectively performs a handover of UE 101 in a manner that efficiently and effectively preserves the performance of the low-latency application.

In some examples, target AS 116 uses a Network Repository Function (NRF) to identify source AS 115 based on the ID for source UPF 113 and the ID for the low-latency application. The NRF may be resident in wireless network core 120, and portions of the NRF may be distributed near wireless access nodes 111-112. Source UPF 113 and AS 115 register with the NRF and indicate their AS/UPF pairing to serve the low-latency application. Source access node 111 signals wireless network core 120 to indicate the handover of UE 101 to target access node 112 and indicates source UPF 113. Wireless network core 120 selects target UPF 114 and AS 116 to serve UE 101 over target access node 112. Wireless network core 120 signals target UPF 114 to connect UE 101 to AS 116 for the low-latency application. Wireless network core 120 also signals target UPF 114 to indicate source UPF 113. Target UPF 114 signals AS 116 to serve the low-latency application to UE 101 and to indicate source UPF 113. Target AS 116 queries the NRF with the ID for UPF 113 and the ID for the low-latency application. The NRF returns the ID for source AS 115. Target AS 116 then uses the ID for source AS 115 to retrieve the UE context for UE 101 from source AS 115.

Wireless UE 101 and wireless access nodes 111-112 wirelessly communicate over wireless links 131-132 using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Wireless access nodes 111-112 communicate with each other over X2 link 133. AS 115-116 communicate with each other over AS link 134. Wireless access nodes 111-112 communicate with wireless network core 120 over backhaul links 135-136. Wireless network core 120 communicates with external systems over external links 137. Links 133-137 use metallic cables, glass fibers, radio waves, or some other communication media. Links 133-137 use IEEE 802.3 (Ethernet), Time Division Multiplex (TDM), Data Over Cable System Interface Specification (DOCSIS), Internet Protocol (IP), 5GNR, LTE, WIFI, virtual switching, inter-processor communication, bus interfaces, and/or some other data communication protocols.

Although UE 101 is depicted as a smartphone, UE 101 might instead comprise a computer, robot, vehicle, or some other data appliance with wireless communication circuitry. Wireless access nodes 111-112 are depicted as towers, but access nodes 111-112 may use other mounting structures or no mounting structure at all. Wireless access nodes 111-112 may comprise 5GNR gNodeBs, LTE eNodeBs, WIFI hotspots, LP-WAN base stations, wireless relays, and/or some other form of wireless network transceivers. Wireless UE 101 and wireless access nodes 111-112 comprise antennas, amplifiers, filters, modulation, and analog/digital interfaces. UE 101, access nodes 111-112, UPF 113-114, AS 115-116, and wireless network core 120 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein. Wireless network core 120 comprises network elements like NRF, Access and Mobility Management Function (AMF), Authentication and Security Function (AUSF), Unified Data Management (UDM), Network Slice Selection Function (NSSF), Policy Control Function (PCF), Session Management Function (SMF), User Plane Function (UPF), Application Function (AF) and/or some other network apparatus. In some examples, the network elements in wireless network core 120 comprise Virtual Network Functions (VNFs) in one or more Network Function Virtualization Infrastructures (NFVIs).

Figure 2:
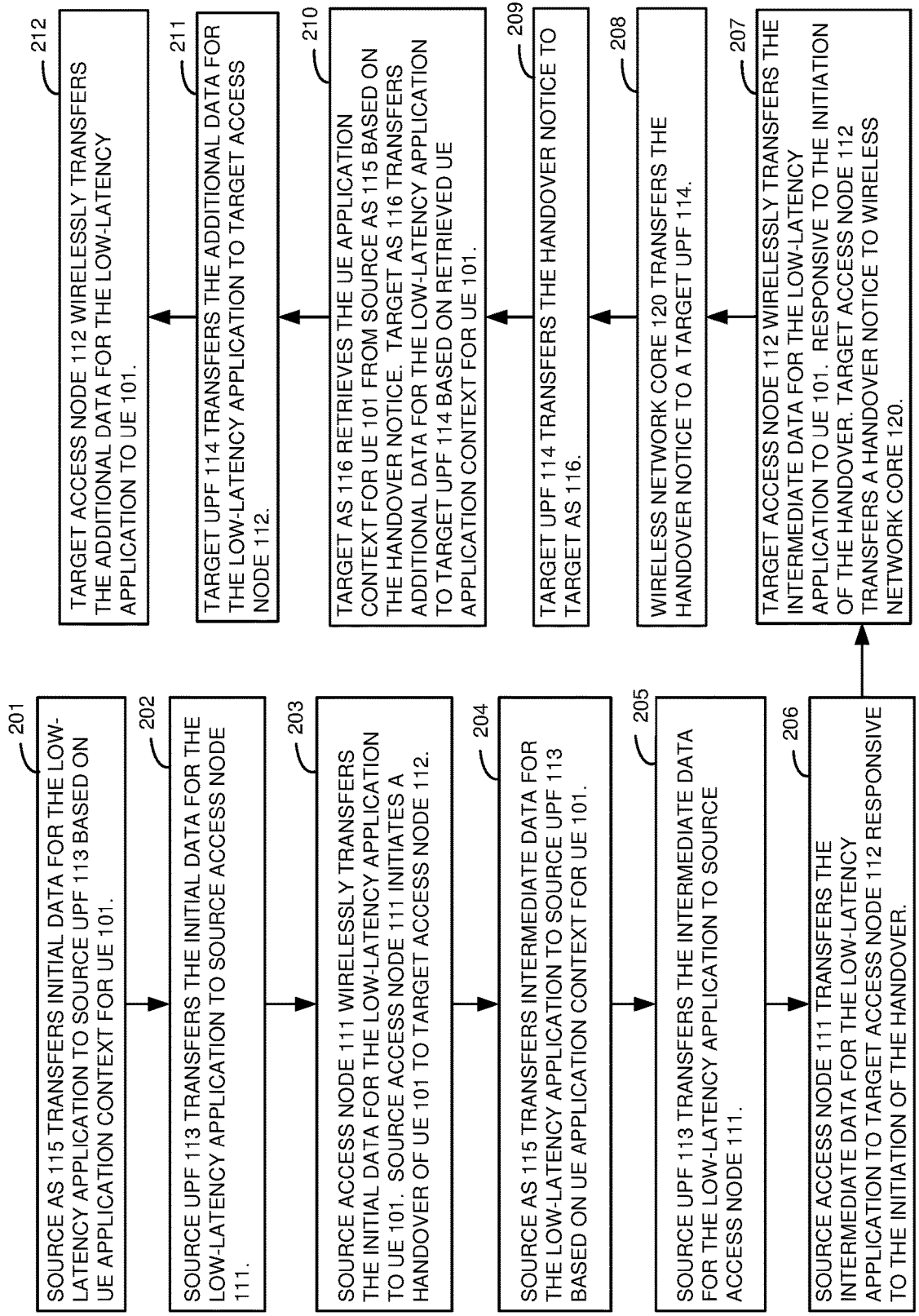
FIG. 2 illustrates an exemplary operation of the wireless communication network to handover the wireless UE that executes the low-latency application.

FIG. 2 illustrates an exemplary operation of wireless communication network 100 to handover wireless UE 101 that executes the low-latency application. The operation may differ in other examples. Source AS 115 transfers initial data for the low-latency application to source UPF 113 based on UE application context for UE 101 (201). For example, AS 115 may annotate live video and use UPF 113 to distribute the annotated video to multiple users. Source UPF 113 transfers initial data for the low-latency application to source access node 111 (202). Source access node 111 wirelessly transfers the initial data for the low-latency application to UE 101 (203). Source access node 111 initiates a handover of UE 101 to target access node 112 (203).

Source AS 115 transfers intermediate data for the low-latency application to source UPF 113 based on the UE application context for UE 101 (204). Source UPF 113 transfers the intermediate data for the low-latency application to source access node 111 (205). Source access node 111 transfers the intermediate data for the low-latency application to target access node 112 responsive to the handover initiation (206). Target access node 112 wirelessly transfers the intermediate data for the low-latency application to UE 101 (207).

Responsive to the initiation of the handover, target access node 112 transfers a handover notice to wireless network core 120 (207). Wireless network core 120 transfers the handover notice to target UPF 114 (208). Target UPF 114 transfers the handover notice to target AS 116 (209). Target AS 116 retrieves the UE application context for UE 101 from source AS 115 based on the handover notice (210). Target AS 116 transfers additional data for the low-latency application to target UPF 114 based on retrieved UE application context for UE 101 (210). Target UPF 114 transfers the additional data for the low-latency application to target access node 112 (211). Target access node 112 wirelessly transfers the additional data for the low-latency application to UE 101 (212). Target access node 112, UPF 114, and AS 116 are now the source access node, source UPF, and source AS for UE 101, and the operation repeats during another handover to another target access node.

Figure 3:
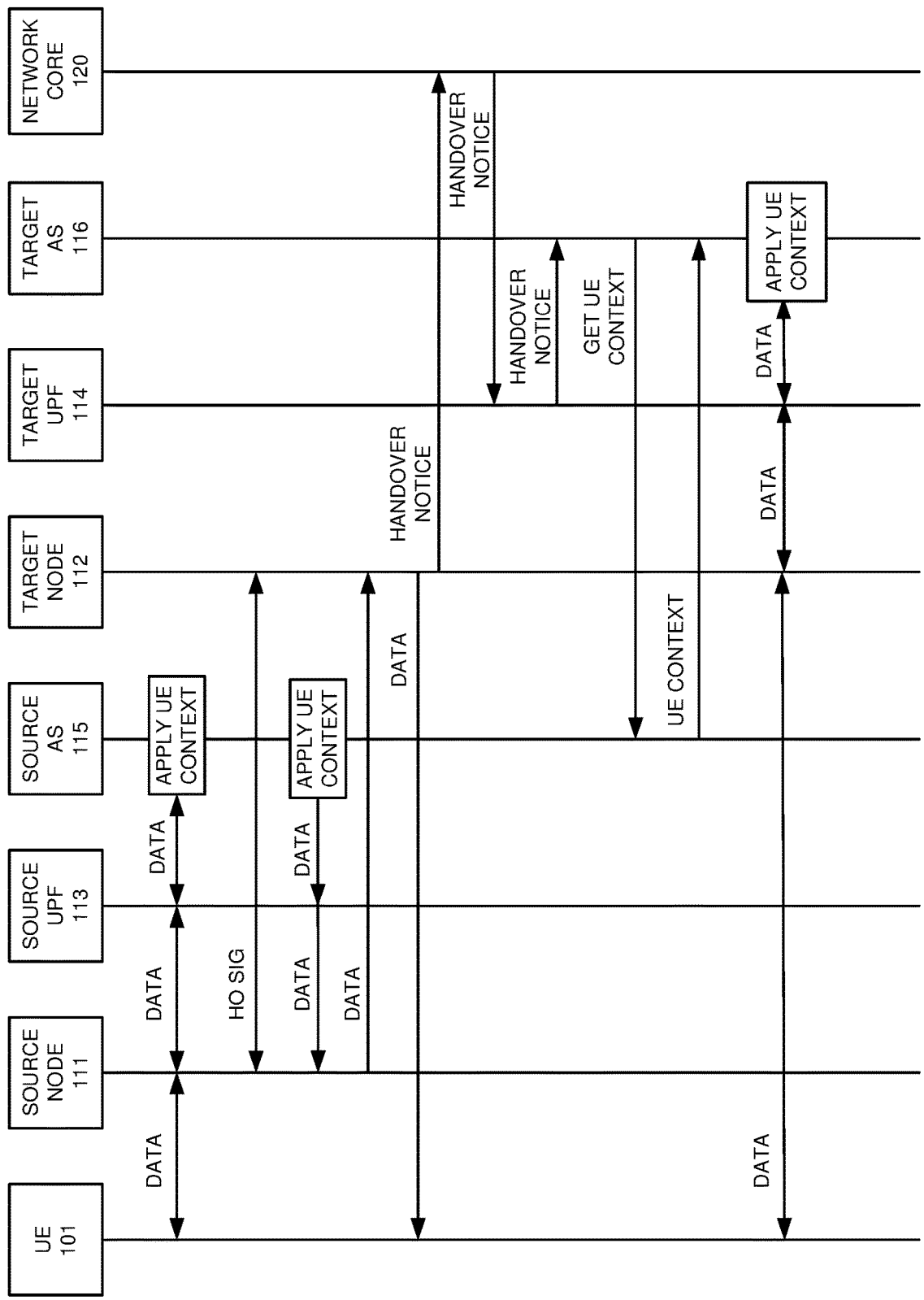
FIG. 3 illustrates an exemplary operation of the wireless communication network to handover the wireless UE that executes the low-latency application.

FIG. 3 illustrates an exemplary operation of wireless communication network 100 to handover wireless UE 101 that executes the low-latency application. The operation may differ in other examples. Source AS 115 applies UE context for UE 101 and exchanges initial data for the low-latency application in UE 101 with source UPF 113. For example, AS 115 may generate navigation instructions and transfer a geographic map with the navigation instructions to the user. Source UPF 113 and source access node 111 exchange the initial data for the low-latency application. Source access node 111 and UE 101 wirelessly exchange the initial data for the low-latency application. Source access nodes 111-112 exchange handover signaling to handover UE 101.

After the initiation of the handover, source AS 115 continues to apply the UE context for UE 101 and transfers intermediate data for the low-latency application in UE 101 to source UPF 113. Source UPF 113 transfers the intermediate data for the low-latency application to source access node 111. Source access node 111 transfers the intermediate data for the low-latency application to target access node 112 responsive to the handover initiation. Target access node 112 wirelessly transfers the intermediate data for the low-latency application to UE 101.

Responsive to the handover initiation, target access node 112 transfers a handover notice to wireless network core 120. Wireless network core 120 transfers the handover notice to target UPF 114. Target UPF 114 transfers the handover notice to target AS 116. Target AS 116 retrieves the UE application context for UE 101 from source AS 115 based on the handover notice. Target AS 116 applies the retrieved UE context for UE 101 to additional data for the low-latency application. Target AS 116 and target UPF 114 exchange the additional data for the low-latency application in UE 101. Target UPF 114 and target access node 112 exchange the additional data for the low-latency application in UE 101. Target access node 112 and UE 101 wirelessly exchange the additional data for the low-latency application.

Figure 4:
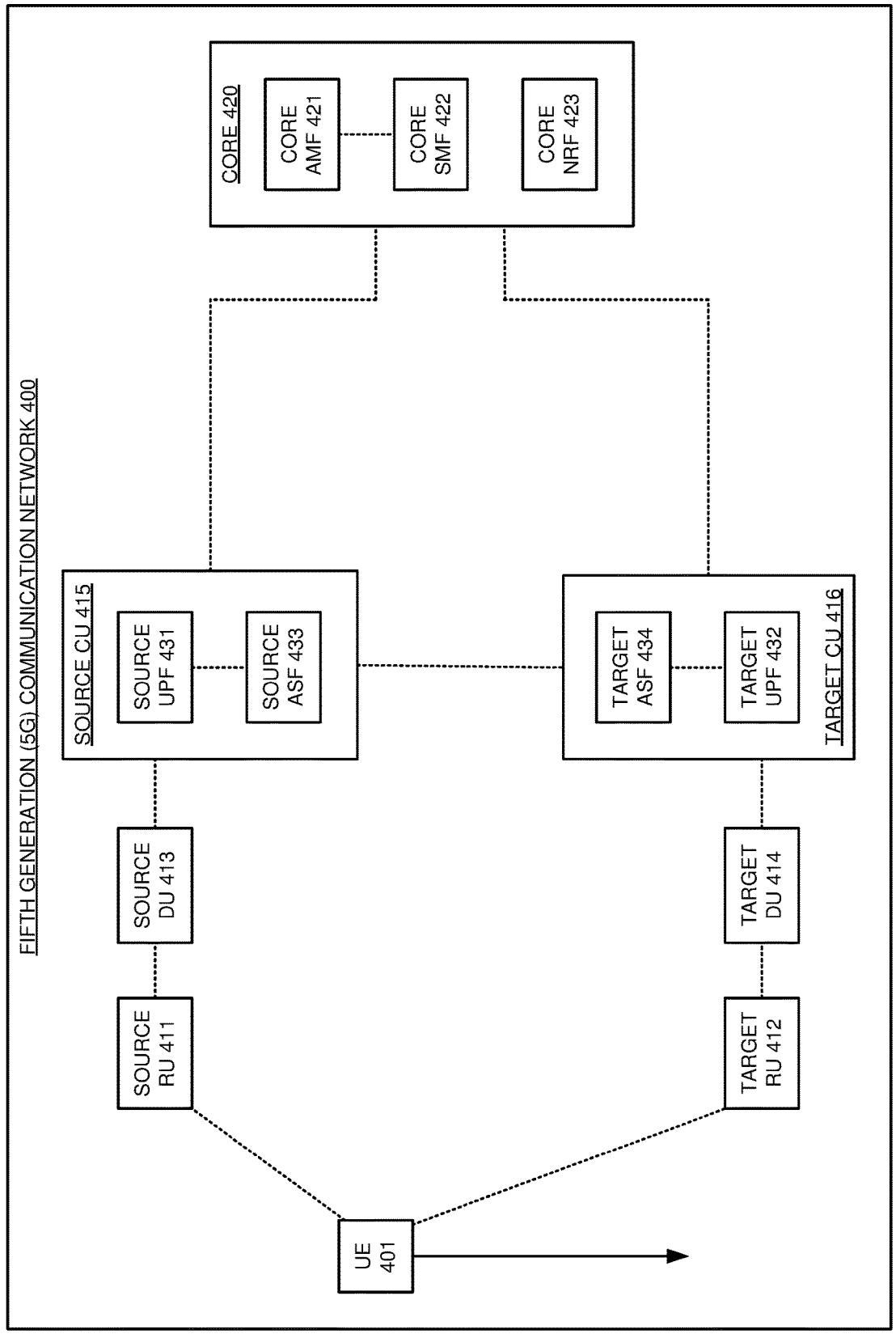
FIG. 4 illustrates a Fifth Generation (5G) communication network to handover a wireless UE that executes a low-latency application.

FIG. 4 illustrates a Fifth Generation (5G) communication network 400 to handover wireless UE 401 that executes a low-latency application. 5G communication network 400 comprises an example of wireless communication network 100, although network 100 may differ. 5G communication network 400 delivers a low-latency wireless data service to UE 401 like video-conferencing, augmented-reality, vehicle navigation, remote keyboard, machine-control, and/or some other wireless networking product. 5G communication network 400 comprises UE 401, Radio Units (RUs) 411-412, Distributed Units (DUs) 413-414, Centralized Units (CUs) 415-416, and wireless network core 420. Wireless network core 420 comprises Access and Mobility Management Function (AMF) 421, Session Management Function (SMF) 422, and Network Repository Function (NRF) 423. Wireless network core 420 typically includes other network functions like Application Function (AF), User Plane Function (UPF), Authentication and Security Function (AUSF), Unified Data Management (UDM), Network Slice Selection Function (NSSF), and Policy Control Function (PCF). Source CU 415 comprises source UPF 431 and Application Server Function (ASF) 433. Target CU 416 comprises target UPF 432 and ASF 434. A source wireless access node comprises RU 411, DU 413, and portions of CU 415. A target wireless access node comprises RU 412, DU 414, and portions of CU 416.

Source UPF 431 registers its Identity (ID) with core NRF 423 and indicates its ability to communicate with source ASF 433. Source ASF 433 registers its ID with core NRF 423 and indicates its ability to serve the low-latency application. Target UPF 432 registers its ID with core NRF 423 and indicates its ability to communicate with target ASF 434. Target ASF 434 registers its ID with core NRF 423 and indicates its ability to serve the low-latency application.

UE 401 and source CU 415 wirelessly exchange attachment signaling over source RU 411 and DU 413. Source CU 415 and AMF 421 exchange attachment signaling for UE 401. AMF 421 and UE 401 exchange authentication signaling over source RU 411, DU 413, and CU 415. AMF 421 selects SMF 422 to serve UE 401. AMF 421 and core SMF 422 exchange session signaling that directs SMF 422 to serve UE 401 with low-latency communications. SMF 422 uses NRF to select source UPF 431 and source ASF 433 to serve UE 401 with low-latency communications. SMF 422 and source UPF 431 exchange N4 signaling that directs UPF 431 to serve UE 401 with low-latency communications to source ASF 433. AMF 421 and source CU 415 exchange N2 signaling that directs CU 415 to serve UE 401 with the low-latency communications.

UE 401 and source RU 411 wirelessly exchange low-latency data for the low-latency application. Source RU 411 and source DU 413 exchange the low-latency data. Source DU 413 and source CU 415 exchange the low-latency data responsive to signaling from AMF 421. Source CU 415 and source UPF 431 exchange the low-latency data responsive to signaling from AMF 421 and SMF 422. Source UPF 431 and ASF 433 exchange the low-latency data responsive to the signaling from SMF 422. ASF 433 processes the low-latency data based on UE application context for UE 401. The UE application context comprises low-latency application data like user ID, session type, session ID, session pointers, and/or other application session metadata.

Due to UE mobility or some other factor, source RU 411, DU 413, and CU 415 initiate a handover of UE 401 to target RU 412, DU 414, and CU 416. CUs 415-416 exchange X2 handover signaling. During the handover, source ASF 433 continues to process low-latency data per the UE application context and to transfer the low-latency data to source UPF 431. Source UPF 431 continues to transfer the low-latency data to source CU 415. Source CU 415 now transfers the low-latency data and to target CU 416 responsive to the X2 handover signaling. Target CU 416 transfers the low-latency data to target DU 414 responsive to the X2 handover signaling. Target DU 414 transfers the low-latency data to target RU 412. Target RU 412 wirelessly transfers the low-latency data to UE 401.

In response to the X2 handover signaling and to transferring the low-latency data for UE 401, target CU 416 transfers an N2 path switch request for UE 401 to core AMF 421. In response, AMF 421 transfers path switch instructions to core SMF 422 to switch UE 401 from source CU 415 and UPF 431 to target CU 416 and UPF 432. SMF 422 transfers N4 signaling to target UPF 432 that directs UPF 432 to exchange low-latency communications for UE 401 between target CU 416 and target ASF 434 to serve the low-latency application. In response to the path switch for the low-latency application, SMF 422 identifies source UPF 431 and the low-latency application to target UPF 432 over N4 signaling. AMF 421 and target CU 416 exchange N2 signaling that directs CU 416 to serve UE 401 with the low-latency communications to target UPF 432.

In response to the N4 signaling from SMF 422 that identifies the low-latency application and source UPF 431 for UE 401, target UPF 432 indicates source UPF 431 and the low-latency application for UE 401 to target ASF 434. In response to the low-latency application handover, target ASF 434 transfers the IDs for source UPF 431 and the low-latency application to core NRF 423. Core NRF 423 translates the IDs for source UPF 431 and the low-latency application into an ID for source ASF 433. Core NRF 423 indicates the ID for source ASF 433 to target ASF 434. Target ASF 434 uses the ID for ASF 433 to retrieve the UE application context for UE 401 for the current session from source ASF 433.

UE 401 and target RU 412 now wirelessly exchange low-latency data for the low-latency application. Target RU 412 and target DU 414 exchange the low-latency data. Target DU 414 and target CU 416 exchange the low-latency data responsive to the N2 signaling from AMF 422. Target CU 416 and target UPF 432 exchange the low-latency data responsive to the N2 signaling from AMF 421 and the N4 signaling from SMF 422. Target UPF 432 and ASF 434 exchange the low-latency data to serve the low-latency application in UE 401 based on the retrieved UE application context for UE 401.

Figure 5:
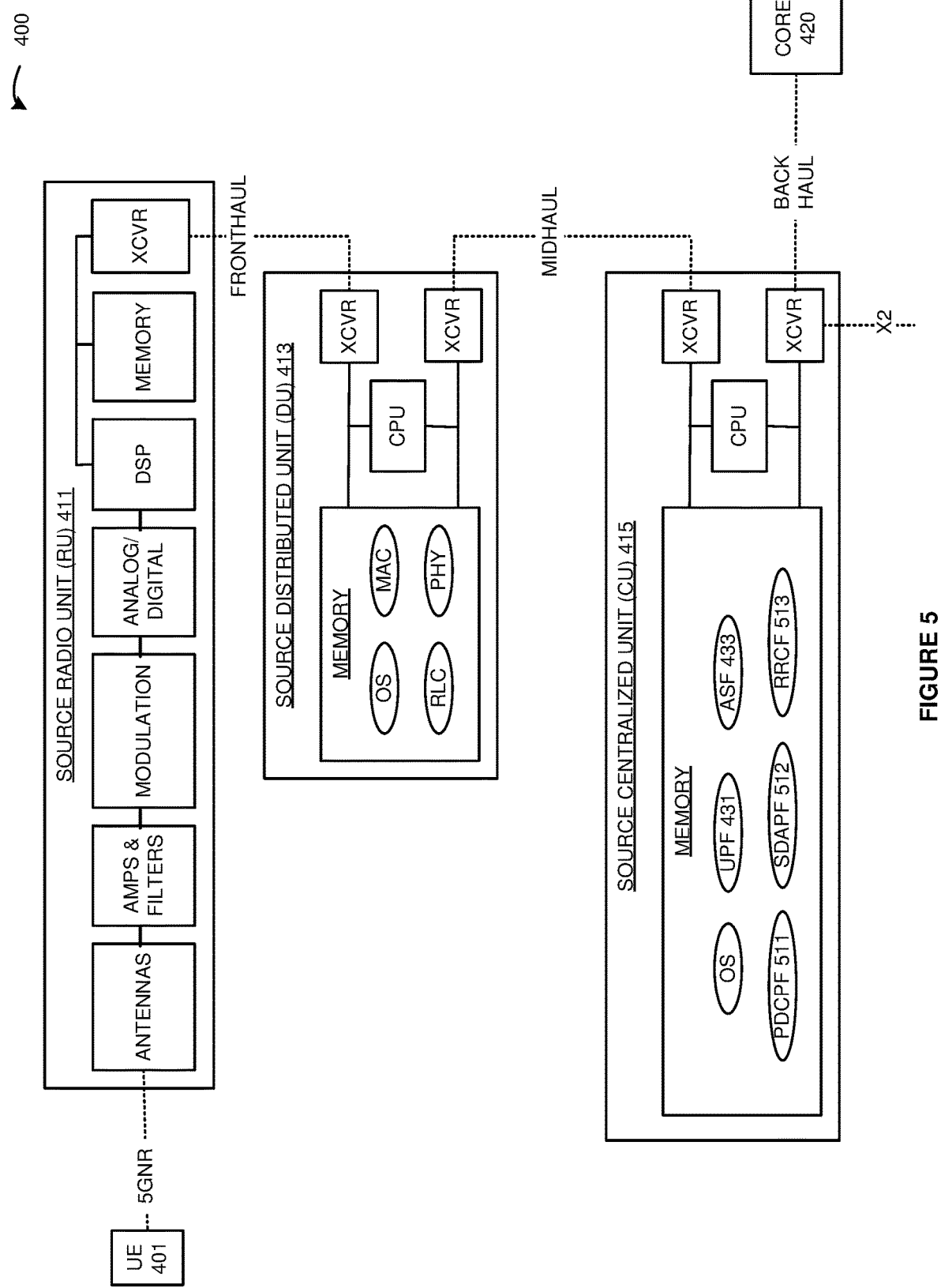
FIG. 5 illustrates a source Radio Unit (RU), Distributed Unit (DU), and Central Unit (CU) to handover the wireless UE that executes the low-latency application.

FIG. 5 illustrates source Radio Unit (RU) 411, Distributed Unit (DU) 413, and Central Unit (CU) 415 to handover wireless UE 401 that executes the low-latency application. RU 411, DU 414, and CU 416 comprises an example of wireless access node 111, although node 111 may differ. Source RU 411 comprises antennas, amplifiers, filters, modulation, analog-to-digital interfaces, DSP, memory, and transceivers (XCVRs) that are coupled over bus circuitry. Source DU 413 comprises memory, CPU, and transceivers that are coupled over bus circuitry. The memory in DU 413 stores an operating system and 5GNR network applications like Physical Layer (PHY), Media Access Control (MAC), and Radio Link Control (RLC). Source CU 415 comprises memory, CPU, and transceivers that are coupled over bus circuitry. The memory in CU 415 stores an operating system and network functions like UPF 432, ASF 434, Packet Data Convergence Protocol Function (PDCPF) 511, Service Data Adaptation Protocol Function (SDAPF) 512, and Radio Resource Control Function (RRCF) 513.

In source DU 413, RLC functions comprise Automatic Repeat Request (ARQ), sequence numbering and resequencing, segmentation and re-segmentation. MAC functions comprise buffer status, power control, channel quality, Hybrid Automatic Repeat Request (HARM), user identification, random access, user scheduling, and QoS. PHY functions comprise packet formation/deformation, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

In source CU 415, UPF 431 performs packet routing & forwarding; packet inspection, QoS handling, and PDU termination. ASF 433 supports one or more low-latency applications in UE 401 like augmented reality, machine control, and the like. PDCPF 441 performs security ciphering, header compression and decompression, sequence numbering and re-sequencing, de-duplication. SDAPF 442 performs QoS marking and flow control. RRCF 443 performs authentication, security, handover control, status reporting, Quality-of-Service (QoS), network broadcasts and pages, and network selection.

UE 401 is wirelessly coupled to the antennas in source RU 411 over 5GNR links. Transceivers in RU 411 are coupled to transceivers in source DU 413 over fronthaul links like enhanced Common Public Radio Interface (eCPRI). Transceivers in source DU 413 are coupled to transceivers in source CU 415 over mid-haul links. Transceivers in source CU 415 are coupled to network core 420 over backhaul links. The CPUs in DU 413 and CU 415 execute their operating systems, PHY, MAC, RLC, PDCPF 511, SDAPF 512, RRCF 513, UPF 431, and ASF 433 to exchange 5GNR signals with UE 401 over RU 411 and to exchange 5GC/X2 signaling and data with core 420 and other CUs.

In RU 411, the antennas receive wireless 5GNR signals from UE 401 that transport uplink 5GNR signaling and data—including low-latency application data. The antennas transfer corresponding electrical uplink signals through duplexers to the amplifiers. The amplifiers boost the electrical uplink signals for filters which attenuate unwanted energy. Demodulators down-convert the filtered uplink signals from their carrier frequency. The analog/digital interfaces convert the demodulated analog uplink signals into digital uplink signals for the DSPs. The DSPs recover uplink 5GNR symbols from the uplink digital signals and transfer the uplink 5GNR symbols to DU 413. In DU 413, the CPU executes the network applications (PHY, MAC, and RLC) to process the uplink 5GNR symbols and recover the uplink 5GNR signaling and data. The RLC in DU 413 transfers UL data units to the PDCPF 511 in CU 415. In CU 415, the CPU executes the network functions (PDCPF 511, SDAPF 512, and RRCF 513) to process the uplink data units and recover the uplink 5GNR signaling and data.

RRCF 513 processes the uplink 5GNR signaling, downlink 5GC N2 signaling, and X2 signaling to generate new downlink 5GNR signaling, new uplink 5GC N2 signaling, and new X2 signaling. RRCF 513 transfers the new uplink 5GC N2 signaling to core 420 and the X2 signaling to other CUs. SDAPF 512 transfers corresponding N3 data to UPF

431. UPF 431 transfers the N3 data to ASF 433. ASF 433 processes the uplink data per UE low-latency application context like the user ID, session ID, session pointers, and so on. For example, ASF 433 may annotate and distribute live video-conferencing data for a multi-user augmented reality application. UPF 431 transfers the downlink data to SDAPF 512—including low-latency application data. SDAPF 512 receives X2 data from other CUs. The 5GNR network functions (RRCF 513, SDAPF 512, PDCPF 511) process the new downlink 5GC signaling and data to generate corresponding downlink data units. PDCPF 511 in CU 415 transfers the downlink data units to the RLC in DU 413. The 5GNR network applications (RLC, MAC, PHY) process the downlink data units to generate corresponding 5GNR symbols. DU 413 transfers the downlink 5GNR symbols to RU 411. In RU 411, the DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and data.

When executed in CU 415, source UPF 431 registers its ID with NRF 423 in core 420 and indicates its ability to communicate with source ASF 433. When executed in CU 415, source ASF 433 registers its ID with NRF 423 in core 420 and indicates its ability to serve the low-latency application. UE 401 and RRCF 513 in source CU 415 wirelessly exchange attachment signaling over source RU 411 and DU 413. RRCF 513 in source CU 415 and AMF 421 in core 420 exchange N2 attachment signaling for UE 401. AMF 421 and UE 401 exchange authentication signaling over source RU 411, DU 413, and CU 415.

SMF 422 in core 420 and source UPF 431 exchange N4 signaling that directs UPF 431 to serve UE 401 with low-latency communications to source ASF 433. AMF 421 in core 420 and RRCF 513 in source CU 415 exchange N2 signaling that directs CU 415 to serve UE 401 with the low-latency communications.

UE 401 and source RU 411 wirelessly exchange low-latency data for the low-latency application. Source RU 411 and source DU 412 exchange the low-latency data. Source DU 413 and source CU 415 exchange the low-latency data responsive to the signaling from AMF 421 in core 420. SDAPF 512 in source CU 415 and source UPF 431 exchange the low-latency data responsive to the signaling from AMF 421 and SMF 422. Source UPF 431 and ASF 433 exchange the low-latency data responsive to the signaling from SMF 422. ASF 433 processes the low-latency data based on UE application context for UE 401.

Due to UE mobility or some other factor, RRCF 513 in CU 415 initiates a handover of UE 401 to target RU 412, DU 414, and CU 416. RRCF 513 in CU 415 and CU 416 exchange X2 handover signaling. During the handover, source ASF 433 continues to process low-latency data per the UE application context and to transfer low-latency data to source UPF 431. Source UPF 431 continues to transfer the low-latency data to SDAPF 512 in source CU 415. SDAPF 512 in CU 415 now transfers the low-latency data and to target CU 416 responsive to the X2 handover signaling. In response to the low-latency application handover, source ASF 433 receives a request from target ASF 434 for the UE application context for UE 401 for the current low-latency application. Source ASF 433 transfers the UE application context for UE 401 for the current low-latency application to target ASF 434.

Figure 6:
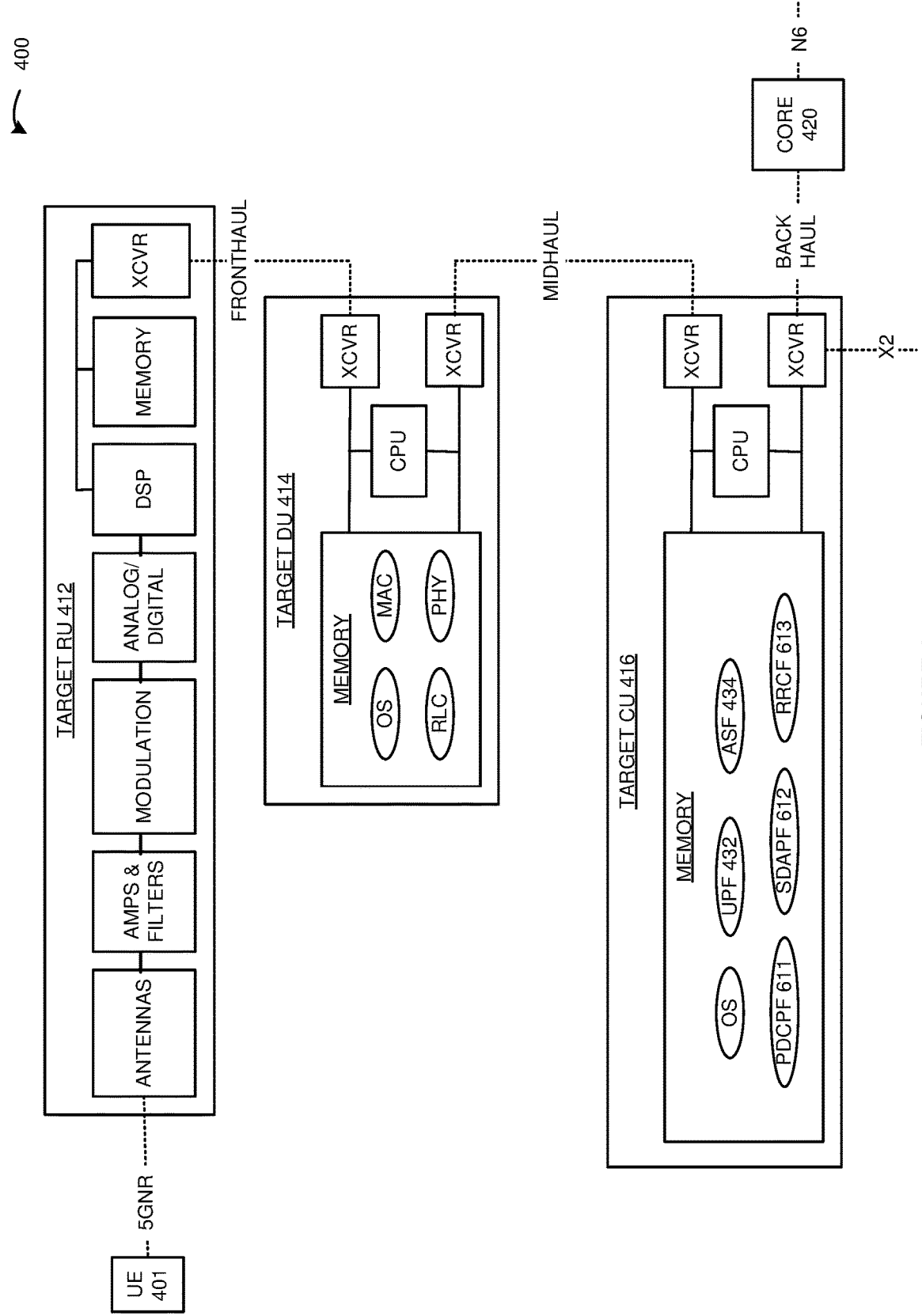
FIG. 6 illustrates a target RU, DU, and CU to handover the wireless UE that executes the low-latency application.

FIG. 6 illustrates target RU 412, DU 414, and CU 416 to handover wireless UE 401 that executes the low-latency application. RU 412, DU 414, and CU 416 comprises an example of wireless access node 112, although node 112 may differ. Target RU 412 comprises antennas, amplifiers, filters, modulation, analog-to-digital interfaces, DSP, memory, and transceivers (XCVRs) that are coupled over bus circuitry. Target DU 414 comprises memory, CPU, and transceivers that are coupled over bus circuitry. The memory in target DU 414 stores an operating system and 5GNR network applications like Physical Layer (PHY), Media Access Control (MAC), and Radio Link Control (RLC). Target CU 416 comprises memory, CPU, and transceivers that are coupled over bus circuitry. The memory in target CU 414 stores an operating system and network functions like UPF 432, ASF 434, Packet Data Convergence Protocol Function (PDCPF) 611, Service Data Adaptation Protocol Function (SDAPF) 612, and Radio Resource Control Function (RRCF) 613.

In target DU 414, RLC functions comprise ARQ, sequence numbering and resequencing, segmentation and re-segmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

In target CU 416, UPF 432 performs packet routing & forwarding, packet inspection, QoS handling, and PDU termination. ASF 434 supports one or more low-latency applications in UE 401 like augmented reality, machine control, and the like. PDCPF 611 performs security ciphering, header compression and decompression, sequence numbering and re-sequencing, de-duplication. SDAPF 612 performs QoS marking and flow control. RRCF 613 performs authentication, security, handover control, status reporting, QoS, network broadcasts and pages, and network selection.

UE 401 is wirelessly coupled to the antennas in RU 412 over 5GNR links. Transceivers in RU 412 are coupled to transceivers in DU 414 over fronthaul links like eCPRI. Transceivers in DU 414 are coupled to transceivers in CU 416 over mid-haul links. Transceivers in CU 416 are coupled to network core 420 over backhaul links. The CPUs in DU 414 and CU 416 execute their operating systems, PHY, MAC, RLC, PDCPF 611, SDAPF 612, RRCF 613, UPF 432, and ASF 434 to exchange 5GNR signals with UE 401 over RU 412 and to exchange 5GC/X2 signaling and data with core 420 and other CUs.

In RU 412, the antennas receive wireless 5GNR signals from UE 401 that transport uplink 5GNR signaling and data—including low-latency application data. The antennas transfer corresponding electrical uplink signals through duplexers to the amplifiers. The amplifiers boost the electrical uplink signals for filters which attenuate unwanted energy. Demodulators down-convert the filtered uplink signals from their carrier frequency. The analog/digital interfaces convert the demodulated analog uplink signals into digital uplink signals for the DSPs. The DSPs recover uplink 5GNR symbols from the uplink digital signals and transfer the uplink 5GNR symbols to DU 414. In DU 414, the CPU executes the network applications (PHY, MAC, and RLC) to process the uplink 5GNR symbols and recover the uplink 5GNR signaling and data. The RLC in DU 414 transfers UL data units to the PDCPF 611 in CU 416. In CU 416, the CPU executes the network function (PDCPF 611, SDAPF 612, and RRCF 613) to process the uplink data units and recover the uplink 5GNR signaling and data. RRCF 613 processes the uplink 5GNR signaling, downlink 5GC N2 signaling, and X2 signaling to generate new downlink 5GNR signaling, new uplink 5GC N2 signaling, and new X2 signaling. RRCF 613 transfers the new uplink 5GC N2 signaling to core 420 and the X2 signaling to other CUs. SDAPF 612 transfers corresponding N3 data to UPF 432—including the low-latency application data. UPF 432 transfers the low latency data to ASF 434. ASF 434 processes the uplink data per UE low-latency application context like the user ID, session ID, session pointers, and so on. For example, ASF 434 may annotate and distribute live video-conferencing data for a multi-user augmented reality application.

In target CU 416, RRCF 443 receives the 5GC N2 signaling from core 420 and X2 signaling from the other CUs. UPF 432 receives low-latency application data from ASF 434. UPF 432 transfers the downlink low-latency data to SDAPF 442. SDAPF 442 also receives data from other CUs. The 5GNR network functions (RRCF 613, SDAPF 612, PDCPF 611) process the new downlink 5GC signaling and data to generate corresponding downlink data units. PDCPF 611 in CU 416 transfers the downlink data units to the RLC in DU 414. The 5GNR network applications (RLC, MAC, PHY) process the downlink data units to generate corresponding 5GNR symbols. DU 414 transfers the downlink 5GNR symbols to RU 412. In RU 412, the DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and data—including low-latency application data.

Target UPF 432 registers its ID with NRF 423 in core 420 and indicates its ability to communicate with target ASF 434. Target ASF 434 registers with NRF 423 in core 420 and indicates its ability to serve the low-latency application.

Due to UE mobility or some other factor, target RRCF 613 receives X2 handover signaling for UE 401 from CU 415. UE 401 attaches to RRCF 613 over RU 412 and DU 414. SDAPF 612 in target CU 416 receives low-latency data from CU 415 and transfers the low-latency data to PDCPF 612 which transfers the low-latency data to the RRC in DU 414. The PHY in DU 414 transfers the low-latency data to target RU 412. Target RU 412 wirelessly transfers the low-latency data to UE 401.

In response to the X2 handover signaling and in response to transferring the low-latency data for UE 401 over SDAPF 612, RRCF 613 transfers an N2 path switch request for UE 401 to AMF 421 in core 420. AMF 421 in core 420 and RRCF 613 then exchange N2 signaling that directs SDAPF 612 to serve UE 401 with the low-latency communications to target UPF 432. In response to the N4 signaling from SMF 422 in core 420 that identifies the low-latency application and source UPF 431 for UE 401, target UPF 432 indicates source UPF 431 and the low-latency application for UE 401 to target ASF 434. In response to the low-latency application handover, target ASF 434 transfers the IDs for source UPF 431 and the low-latency application to NRF 423 in core 420. NRF 423 in core 420 returns the ID for source ASF 433 to target ASF 434. Target ASF 434 uses the ID for ASF 433 to retrieve the UE application context for UE 401 for the current session from source ASF 433.

UE 401 and target RU 412 now wirelessly exchange low-latency data for the low-latency application. Target RU 412 and target DU 414 exchange the low-latency data. The RLC in target DU 414 and the PDCPF 611 in target CU 416 exchange the low-latency data responsive to the N2 signaling from AMF 421 in core 420. SDAPF 612 and target UPF 432 exchange the low-latency data responsive to the N2 signaling from AMF 421 and the N4 signaling from SMF 422 in core 420. Target UPF 432 and ASF 434 exchange the low-latency data responsive to the N4 signaling from SMF 422 in core 420. ASF 434 serves the low-latency application in UE 401 based on the retrieved UE application context for UE 401.

Figure 7:
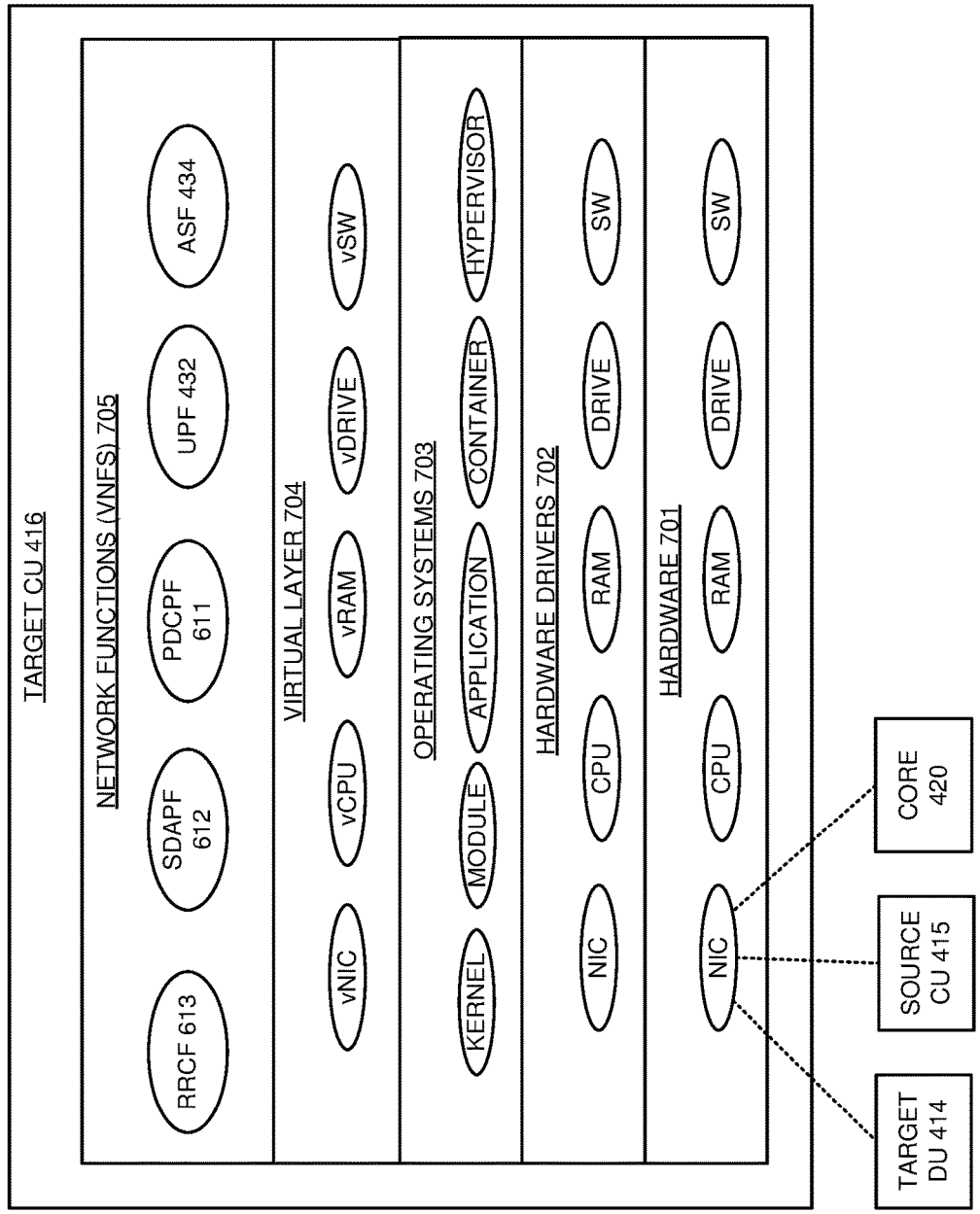
FIG. 7 illustrates the target CU that accepts the handover of the wireless UE that executes the low-latency application.

FIG. 7 illustrates target CU 416 to handover wireless UE 401 that executes the low-latency application. CU 416 comprises an example of CUs 115-116 and 415, although CUs 115-116 and 415 may differ. CU 416 comprises hardware 701, hardware drivers 702, operating systems 703, virtual layer 704, and Virtual Network Functions (VNFs) 705. Hardware 701 comprises Network Interface Cards (NIC), CPU, RAM, flash/disk drives, and data switches (SW). Hardware drivers 702 comprise software that is resident in the NIC, CPU, RAM, DRIVE, and SW. Operating systems 703 comprise kernels, modules, applications, containers, hypervisors, and the like. Virtual layer 704 comprises virtual NICs (vNIC), virtual CPUs (vCPU), virtual RAM (vRAM), virtual Drives (vDRIVE), and virtual Switches (vSW). VNFs 705 comprise the RRCF 613, SDAPF 612, PDCPF 613, UPF 432, and ASF 434. The NIC are coupled to target DU 414, source CU 415, and network core 420. CU 416 may be located at a single site or be distributed across multiple geographic locations. Hardware 701 executes hardware drivers 702, operating systems 703, virtual layer 704, and VNFs 705 to serve UE 401 over DU 414. Target CU 416 exchanges 5GC signaling and data with network core 420 to serve UE 401 with the wireless data services.

Figure 8:
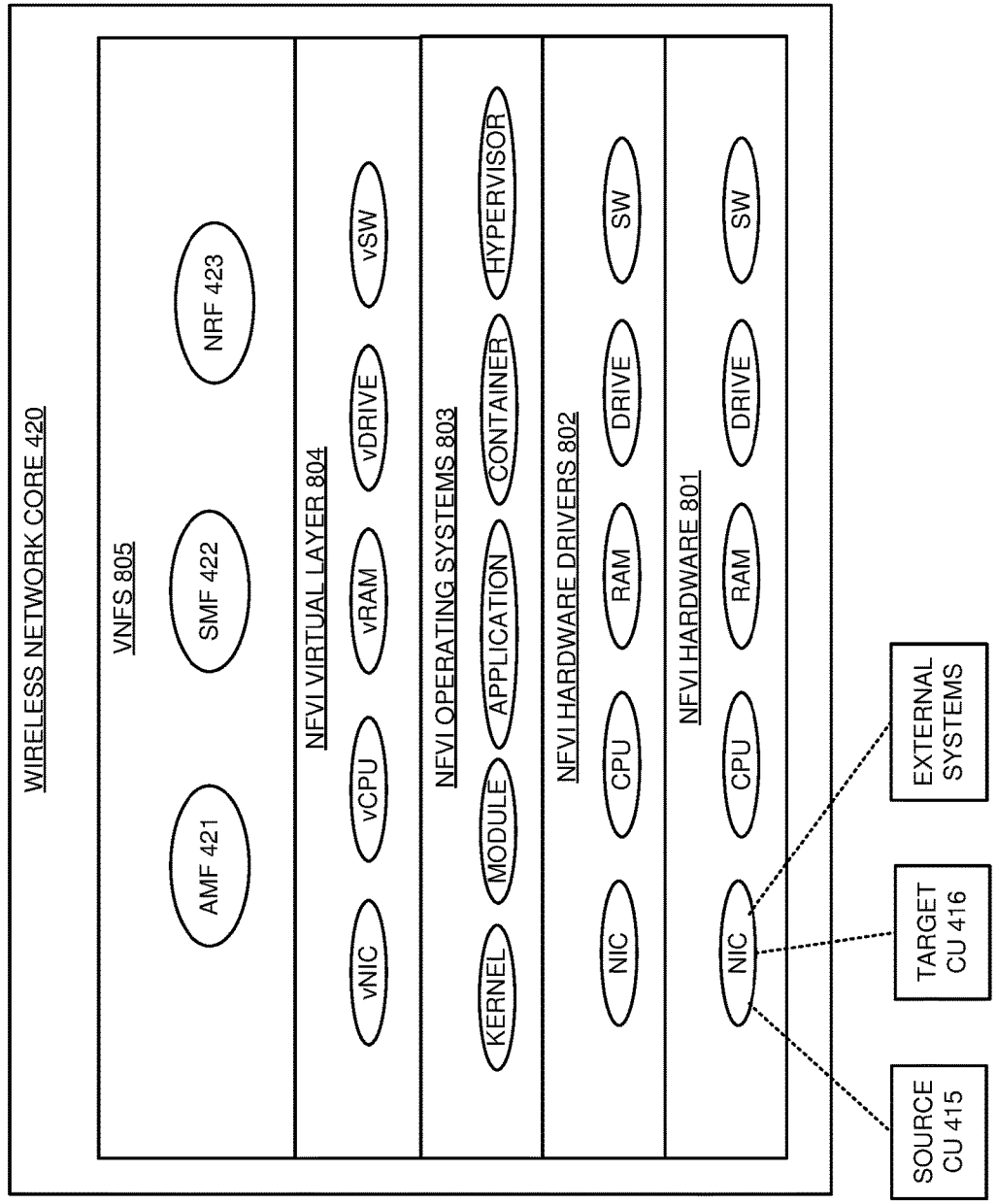
FIG. 8 illustrates a wireless network core to facilitate the handover the wireless UE that executes the low-latency application.

FIG. 8 illustrates wireless network core 420 to handover wireless UE 401 that executes the low-latency application. NFVI 420 comprises an example of wireless network core 120, although network core 120 may differ. NFVI 420 comprises NFVI hardware 801, NFVI hardware drivers 802, NFVI operating systems 803, NFVI virtual layer 804, and NFVI Virtual Network Functions (VNFs) 805. NFVI hardware 801 comprises NIC, CPU, RAM, flash/disk drives, and SW. NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise Access and Mobility Management Function (AMF) 421, Session Management Function (SMF) 422, and Network Repository Function (NRF) 423. Other VNFs like Authentication and Security Function (AUSF), User Plane Function (UPF), Unified Data Manager (UDM), Network Slice Selection Function (NSSF), Policy Control Function (PCF) are typically present but are omitted for clarity. NFVI 420 may be located at a single site or be distributed across multiple geographic locations. The NIC are coupled to CUs 415-416 and external systems. NFVI hardware 801 executes NFVI hardware drivers 802, NFVI operating systems 803, NFVI virtual layer 804, and NFVI VNFs 805 to serve UE 401 over CUs 415-416. NFVI 420 exchanges 5GC signaling and data with CUs 415-416 to serve UE 401 with the wireless data services.

AMF 421 performs N2/N1 termination, N1 ciphering & integrity protection, UE registration, SMF/PCF selection, UE connection/mobility management, UE authentication and authorization, UE security management, and tracking area updates. SMF 422 perform session establishment/management, network address allocation, N1 termination, downlink data notification, and traffic steering and routing. NRF 423 performs network function authentication and authorization, network function selection, and network function security. Although not shown for clarity, AUSF performs UE authentication with Authentication and Key Agreement (AKA) credentials and handles UE authorizations. UDM handles UE context. UE subscription data, and UE authentication keys. NSSF performs network slice selection per UE, network slice authorization per UE, and AMF reselection per UE. PCF performs policy framework implementation, and policy control-plane distribution. UPF performs packet routing & forwarding, packet inspection, QoS handling, PDU interconnection, and mobility anchoring.

NRF 423 receives registrations from UPFs that indicate their IDs and ASF support. NRF 423 receives registrations from ASFs that indicate their IDs and low-latency application support. AMF 421 receives attachment signaling for UE 401 from CU 415. AMF 421 and UE 401 exchange authentication signaling over source CU 415. AMF 421 selects SMF 422 to serve UE 401. AMF 421 and core SMF 422 exchange session signaling that directs SMF 422 to serve UE 401 with low-latency communications. SMF 422 uses NRF 423 to select source UPF 431 and source ASF 433 to serve UE 401 with low-latency communications. SMF 422 and source UPF 431 exchange N4 signaling that directs UPF 431 to serve UE 401 with low-latency communications to source ASF 433. AMF 421 and source CU 415 exchange N2 signaling that directs CU 415 to serve UE 401 with the low-latency communications.

AMF 421 receives an N2 path switch request for UE 401 from target CU 416. In response, AMF 421 transfers path switch instructions to core SMF 422 to switch UE 401 from source CU 415 and UPF 431 to target CU 416 and UPF 432. SMF 422 transfers N4 signaling to target UPF 434 that directs UPF 434 to exchange low-latency communications for UE 401 between target CU 416 and target ASF 434 for the low-latency application. In response to the path switch for the low-latency application, SMF 422 identifies source UPF 421 and the low-latency application to target UPF 432 over N4 signaling. AMF 421 and target CU 416 exchange N2 signaling that directs CU 416 to serve UE 401 with the low-latency communications to target UPF 432. NRF 423 receives the IDs for source UPF 431 and the low-latency application from CU 416. NRF 423 translates the IDs for source UPF 431 and the low-latency application into an ID for source ASF 433. Core NRF 423 indicates the ID for source ASF 433 to target CU 416.

Figure 9:
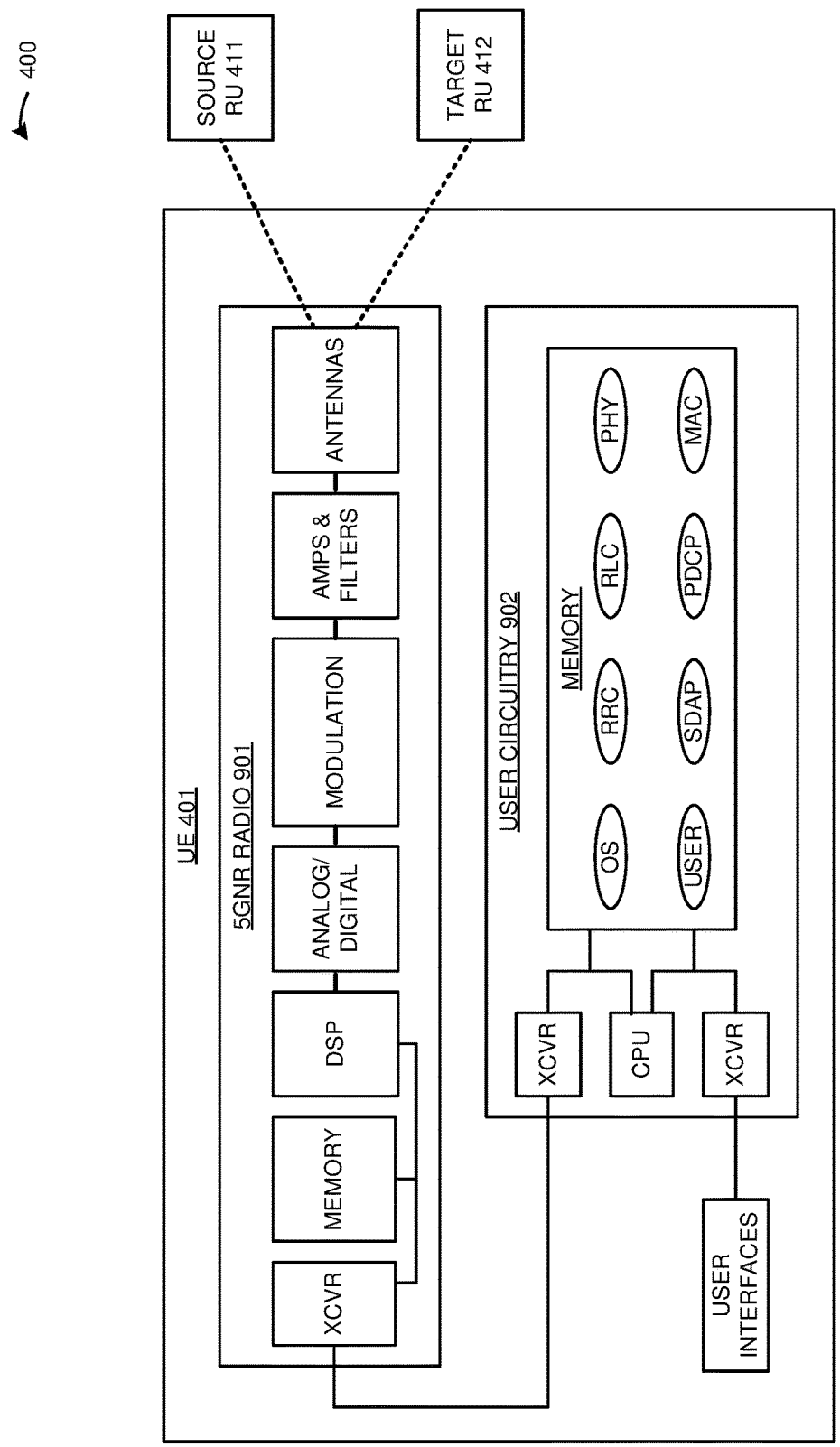
FIG. 9 illustrates a wireless UE that is handed-over when executing the low-latency application.

FIG. 9 illustrates wireless UE 401 that is handed over when executing the low-latency application. UE 401 comprises an example of UE 101, although UE 101 may differ. UE 401 comprises 5GNR radio 901 and user circuitry 902. 5GNR radio 901 comprises antennas, amplifiers, filters, modulation, analog-to-digital interfaces, DSP, memory, and transceivers that are coupled over bus circuitry. User circuitry 902 comprises memory, CPU, user interfaces, and transceivers that are coupled over bus circuitry. The memory in user circuitry 902 stores an operating system, low-latency applications (USER), and 5GNR network applications for PHY, MAC, RLC, PDCP, SDAP, and RRC. The antennas in 5GNR radio 901 are wirelessly coupled to RUs 411-412 over 5GNR links. Transceivers in 5GNR radios 901 are coupled to a transceiver in user circuitry 902. A transceiver in user circuitry 902 is typically coupled to the user interfaces like displays, controllers, memory, and the like. The CPU in user circuitry 902 executes the operating system, PHY, MAC, RLC, PDCP, SDAP, and RRC to exchange 5GNR signaling and data with 5GNR RUs 411-412 over 5GNR radio 901.

Figure 10:
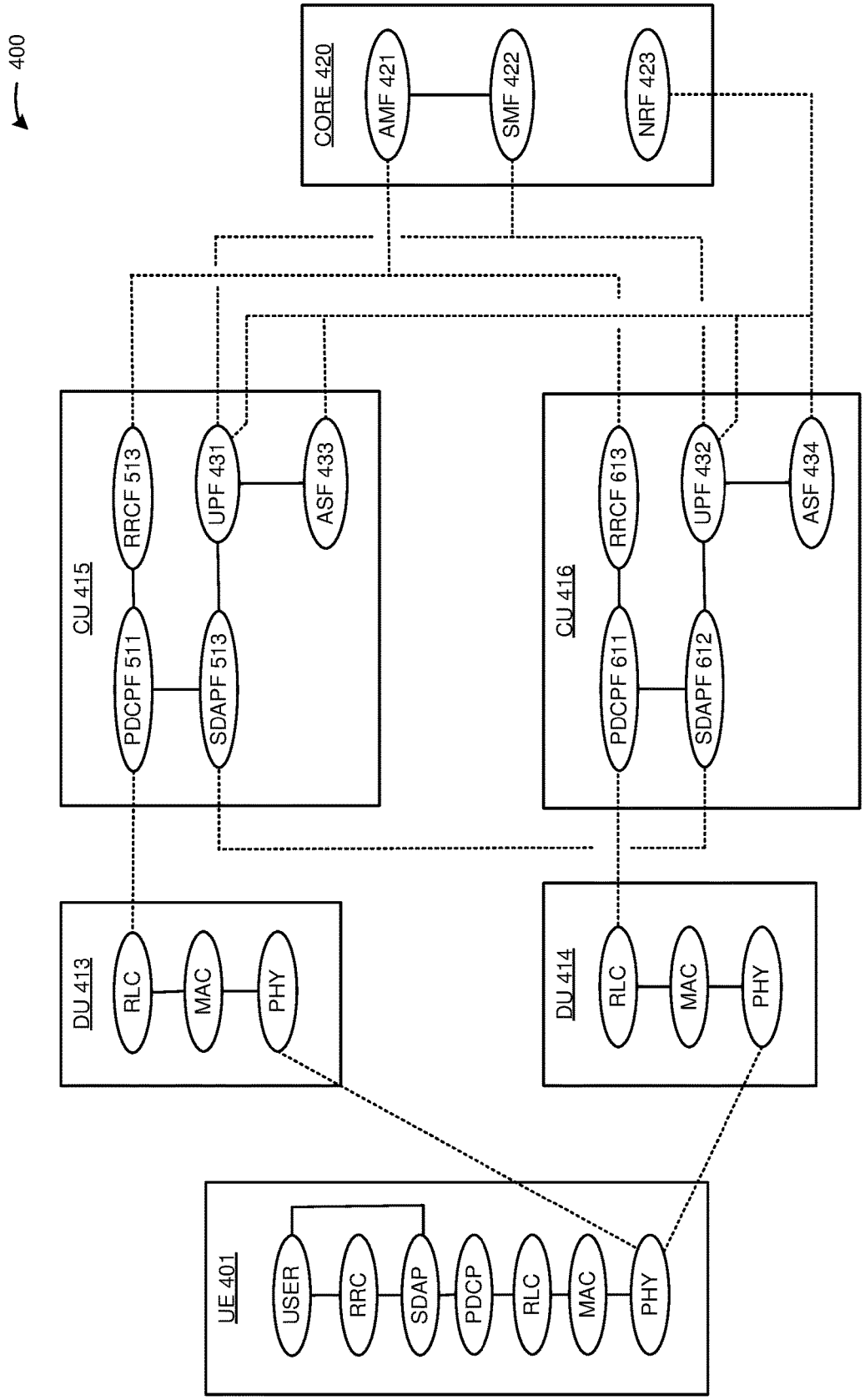
FIG. 10 illustrates an exemplary operation of the 5G communication network to handover the wireless UE that executes the low-latency application.

FIG. 10 illustrates an exemplary operation of 5G communication network 400 to handover wireless UE 401 that executes the low-latency application. The illustrated operation is exemplary and may vary in other examples. The RRC in UE 401 attaches to RRCF 511 in CU 415. RRCF 511 selects AMF 421 for UE 401 based on UE location and possibly slice ID. RRCF 511 transfers initial UE signaling for UE 401 to AMF 421. To authenticate UE 401, AMF 421 interacts with an AUSF which interacts with a UDM to challenge and verify the identity of UE 401 over RRCF 513 in CU 415. AMF 421 interacts with a UDM to obtain subscription data for UE 401 like a low-latency DNN. AMF 421 interacts with an NSSF to obtain slice data for the DNNs for UE 401 like prioritized and authorized low-latency slice IDs for the low-latency DNN. AMF 421 selects SMF 422 based on the low-latency DNN and the UE location. SMF 422 interacts with NRF 423 to select a PCF based on the low-latency DNN and slice ID. AMF 421 interacts with the PCF to obtain policy data like low-latency Quality-of-Service Flow Indicators (QFIs) for UE 401 and its low-latency DNN and slice ID. SMF 422 interacts with NRF 423 to select UPF 431 and ASF 433 based on the low-latency DNN and UE location. SMF 422 allocates a network address for the low-latency DNN to UE 401.

AMF 421 directs RRCF 511 to serve UE 401 using the low-latency DNN, slice ID, QFI, network addresses, and the like. SMF 422 directs UPF 431 to serve UE 401 over DU 413 for the low-latency DNN. RRCF 513 in CU 415 signals the RRC in UE 401 to use the low-latency DNN, slice ID, QFI, network addresses, and the like. The low-latency user application and the SDAP in UE 401 exchange low-latency user data. The SDAP in UE 401 and RLC in RU 411 exchange the low-latency user data. The RLC in DU 413 and SDAPF 513 in CU 415 exchange the low-latency user data. In CU 415, SDAPF 513 and UPF 431 exchange the low-latency user data based on the DNN, slice ID, QFI, network address, and the like. UPF 431 and ASF 431 exchange the low-latency user data based on the DNN, slice ID, QFI, network address, and the like. ASF 431 applies UE context for UE 401 like application version, session ID, UE ID, session pointers, and other low-latency application metadata.

Due to UE mobility or some other factor, source RRCF 513 initiates a handover of UE 401 to CU 416. RRCF 513 and RRCF 613 exchange X2 handover signaling. During the handover, source ASF 433 continues to process low-latency data per the UE application context and to transfer low-latency data to source UPF 431. Source UPF 431 continues to transfer the low-latency data to source SDAPF 513. Source SDAPF 513 now transfers the low-latency data and to target SDAPF 612 responsive to the X2 handover signaling. SDAPF 612 transfers the low-latency data to target DU 414 responsive to the X2 handover signaling. Target DU 414 transfers the low-latency data to UE 401 over the RU.

In response to the X2 handover signaling and to transferring the low-latency data for UE 401, RRCF 613 transfers an N2 path switch request for UE 401 to core AMF 421. In response, AMF 421 transfers path switch instructions to core SMF 422 to switch UE 401 from source CU 415 to target CU 416. SMF 422 uses NRF 423 to select UPF 432 and ASF 434. SMF 422 transfers N4 signaling to target UPF 432 that directs UPF 432 to exchange low-latency communications for UE 401 between SDAPF 612 and target ASF 434 to serve the low-latency application. In response to the path switch for the low-latency application, SMF 422 identifies source UPF 421 and the low-latency application to target UPF 432 over N4 signaling. AMF 421 and target RRCF 612 exchange N2 signaling that directs CU 416 to serve UE 401 with the low-latency communications to target UPF 432.

In response to the N4 signaling from SMF 422 that identifies the low-latency application and source UPF 431 for UE 401, target UPF 432 indicates source UPF 431 and the low-latency application for UE 401 to target ASF 434. In response to the low-latency application handover, target ASF 434 transfers the ID for source UPF 431 and the ID for the low-latency application to core NRF 423. Core NRF 423 translates the IDs for source UPF 431 and the low-latency application into an ID for source ASF 433. Core NRF 423 indicates the ID for source ASF 433 to target ASF 434. Target ASF 434 uses the ID for ASF 433 to retrieve the UE application context for UE 401 for the current session from source ASF 433—possibly over the X2 link.

UE 401 and target RU 412 now wirelessly exchange low-latency data for the low-latency application. Target RU 412 and target DU 414 exchange the low-latency data. Target DU 414 and SDAPF 612 in target CU 416 exchange the low-latency data responsive to the N2 signaling from AMF 422. SDAPF 612 and target UPF 432 exchange the low-latency data responsive to the N2 signaling from AMF 421 and the N4 signaling from SMF 422. Target UPF 432 and ASF 434 exchange the low-latency data responsive to the N4 signaling from SMF 422, ASF 434 serves the low-latency application in UE 401 based on the retrieved UE application context for UE 401.

The wireless data network circuitry described above comprises computer hardware and software that form special-purpose network circuitry to handover wireless UEs that execute low-latency applications. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to handover wireless UEs that execute low-latency applications.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UE) that executes a low-latency application, the method comprising:
   a source Application Server (AS) exchanging low-latency data with the UE over a source wireless access node based on application context for the UE that comprises a user identifier, a session identifier, and a session pointer;
   a target AS receiving a handover notice and responsively retrieving the application context for the UE from the source AS; and
   the target AS exchanging additional low-latency data with the UE over a target wireless access node based on the application context for the UE that comprises the user identifier, the session identifier, and the session pointer.

2. The method of claim 1 wherein the application context for the UE further comprises a low-latency application version.

3. The method of claim 1 wherein the application context for the UE further comprises a low-latency application metadata.

4. The method of claim 1 wherein the application context for the UE comprises low-latency application session parameters for the UE.

5. The method of claim 1 wherein the source wireless access node and the target wireless access node comprise Fifth Generation New Radio (5GNR) access nodes.

6. The method of claim 1 wherein the low-latency application comprises a video-conferencing application.

7. The method of claim 1 wherein the low-latency application comprises an augmented-reality application.

8. The method of claim 1 wherein the low-latency application comprises a vehicle-navigation application.

9. The method of claim 1 wherein the low-latency application comprises a remote-keyboard application.

10. The method of claim 1 wherein the low-latency application comprises a machine-control application.

11. A wireless communication network to serve User Equipment (UE) that executes a low-latency application, the wireless communication network comprising:

a source Application Server (AS) configured to exchange low-latency data with the UE over a source wireless access node based on application context for the UE that comprises a user identifier, a session identifier, and a session pointer;

a target AS configured to receive a handover notice and responsively retrieve the application context for the UE from the source AS; and the target AS configured to exchange additional low-latency data with the UE over a target wireless access node based on the application context for the UE that comprises the user identifier, the session identifier, and the session pointer.

12. The wireless communication network of claim 11 wherein the application context for the UE further comprises a low-latency application version.

13. The wireless communication network of claim 11 wherein the application context for the UE further comprises a low-latency application metadata.

14. The wireless communication network of claim 11 wherein the application context for the UE comprises low-latency application session parameters for the UE.

15. The wireless communication network of claim 11 wherein the source wireless access node and the target wireless access node comprise Fifth Generation New Radio (5GNR) access nodes.

16. The wireless communication network of claim 11 wherein the low-latency application comprises a video-conferencing application.

17. The wireless communication network of claim 11 wherein the low-latency application comprises an augmented-reality application.

18. The wireless communication network of claim 11 wherein the low-latency application comprises a vehicle-navigation application.

19. The wireless communication network of claim 11 wherein the low-latency application comprises a remote-keyboard application.

20. The wireless communication network of claim 11 wherein the low-latency application comprises a machine-control application.

* * * * *